(12) United States Patent
Wolters

(10) Patent No.: US 7,380,798 B2
(45) Date of Patent: Jun. 3, 2008

(54) METHOD FOR CLAMPING AND SUBSEQUENTLY MACHINING A DISK OR RING-SHAPED WORKPIECE

(75) Inventor: Martin Wolters, Wuppertal (DE)

(73) Assignee: Thielenhaus Microfinish Corporation, Novi, MI (US)

( * ) Notice: Subject to any disclaimer, the term of this patent is extended or adjusted under 35 U.S.C. 154(b) by 359 days.

(21) Appl. No.: 11/104,930

(22) Filed: Apr. 13, 2005

(65) Prior Publication Data
US 2005/0236780 A1 Oct. 27, 2005

(30) Foreign Application Priority Data
Apr. 28, 2004 (DE) .................... 10 2004 020 723

(51) Int. Cl.
B23B 31/10 (2006.01)
(52) U.S. Cl. .................. 279/2.17; 279/2.15; 279/2.22; 409/131; 409/219; 269/48.1
(58) Field of Classification Search .............. 279/2.1, 279/2.11, 2.12, 2.15, 2.17, 2.22; 409/131, 409/132, 219; 269/48.1
See application file for complete search history.

(56) References Cited
U.S. PATENT DOCUMENTS

| 2,513,412 | A | * | 7/1950 | Holsing | 279/2.12 |
| 2,755,093 | A | | 7/1956 | Peter et al. | |
| 2,801,858 | A | | 8/1957 | Spieth | |
| 3,026,115 | A | * | 3/1962 | Braner, Jr. et al. | 279/2.22 |
| 3,151,871 | A | | 10/1964 | Multer | |
| 4,106,783 | A | | 8/1978 | Glimpel | |
| 4,116,453 | A | | 9/1978 | Andre | |
| 4,378,186 | A | | 3/1983 | Alexandre | |
| 4,958,839 | A | * | 9/1990 | Guzik et al. | 279/2.14 |
| 5,014,143 | A | * | 5/1991 | Mori et al. | 360/99.12 |
| 2005/0161887 | A1 | * | 7/2005 | Hisamoto | 279/2.12 |

FOREIGN PATENT DOCUMENTS
WO WO 8805359 A1 * 7/1988

* cited by examiner

Primary Examiner—Monica Carter
Assistant Examiner—Eric A. Gates
(74) Attorney, Agent, or Firm—VanOphem & VanOphem, P.C.

(57) ABSTRACT

The invention pertains to a method and apparatus for clamping and subsequently machining a disk- or ring-shaped workpiece, wherein the workpiece is set down on a contact surface of a contact member made from elastomeric material. The workpiece is axially pressed against the contact surface with an elastomeric-material clamping member of a clamping device and simultaneously fixed in place perpendicular to the workpiece axis. Subsequently, the workpiece is machined with a tool.

7 Claims, 3 Drawing Sheets

METHOD FOR CLAMPING AND SUBSEQUENTLY MACHINING A DISK OR RING-SHAPED WORKPIECE

CROSS REFERENCE TO RELATED APPLICATIONS

This application claims the benefit of German Patent Application No. 102004020723 filed Apr. 27, 2004.

BACKGROUND OF THE INVENTION

1. Field of the Invention

The invention pertains to a method for clamping and subsequently machining a disk- or ring-shaped workpiece.

2. Description of Related Art

For mechanical machining of an end face of a thin-walled disk or ring-shaped workpiece a chucking means that absorbs the machining forces that occur without changing its own form and position is required. For workpieces that have a flat or geometrically uniform reference or contact surface which can be clamped, chucking can be done with ordinary clamping means such as jaw chucks, collet chucks or magnetic chucks. If such a uniform reference contact surface is not available, for instance, for rough cast and forged parts or for parts that are warped due to heat treatment, then the known prior art clamping means can no longer be used. This applies particularly if high requirements are placed on a precise and uniform shape and surface quality. In such cases, the workpiece can be accommodated or clamped only with expensive means of little flexibility. Examples of this are casting in, gluing onto or the use of a hydrolock chuck collet, which are well known in the prior art.

Against the background of the above-described problem, the problem underlying the invention is to specify a method for clamping and subsequently machining a disk- or ring-shaped workpiece that permits easy machining independently of the presence of a reference or contact surface of the workpiece.

BRIEF SUMMARY OF THE INVENTION

According to the invention, the problem is solved by a method for clamping and subsequently machining a disk- or ring-shaped workpiece, wherein the workpiece is set down on a contact surface of a contact element made from elastomeric material, wherein the workpiece is pressed against the contact surface with an elastomeric-material clamping means of a clamping device and simultaneously fixed in place perpendicular to the workpiece axis, and wherein the workpiece is subsequently machined with a tool. The clamping device is simple in structure and in use and can easily be adapted to varying workpiece geometries by interchangeable parts. In the operated state, the clamping device preferably builds up a radial and an axial force with respect to the workpiece. The axial force presses the workpiece against the elastic contact element while the radial force centers the workpiece. The stiffness of the elastic elements and the size of the axial and radial clamping forces are dependent on the machining forces that occur and should preferably be designed such that the deformation of the workpiece from the clamping process and the movement of the workpiece is minimal.

For the fixation of the workpiece, the clamping means expediently undergoes a radial feeding motion against the workpiece and preferably a motion parallel to the workpiece axis at the same time. An O-ring can be used as the clamping means.

Preferably the axial machining forces of the tool that act on the workpiece are adjusted such that the resultant of these forces lies in the vicinity of the workpiece axis. During the machining process, which can consist, for instance, of grinding, honing or milling, an uncontrolled shifting of the workpiece axis with respect to the spindle axis of the tool is thereby avoided. The magnitude of the axial force exerted by the clamping means expediently corresponds to essentially the total axial force acting on the workpiece due to machining. In this way, an equilibrium arises between the axial initial tension from the elastic contact element and the machining force, and deformation of the workpiece does not occur.

The object of the invention is also a device for clamping a workpiece to carry out the method. Expedient configurations of this device are described in the claims.

BRIEF DESCRIPTION OF THE SEVERAL VIEWS OF THE DRAWINGS

The invention will be explained below in detail on the basis of a drawing illustrating only one embodiment. Schematically shown are.

DETAILED DESCRIPTION OF THE PREFERRED EMBODIMENT OF THE INVENTION

Figure 1:
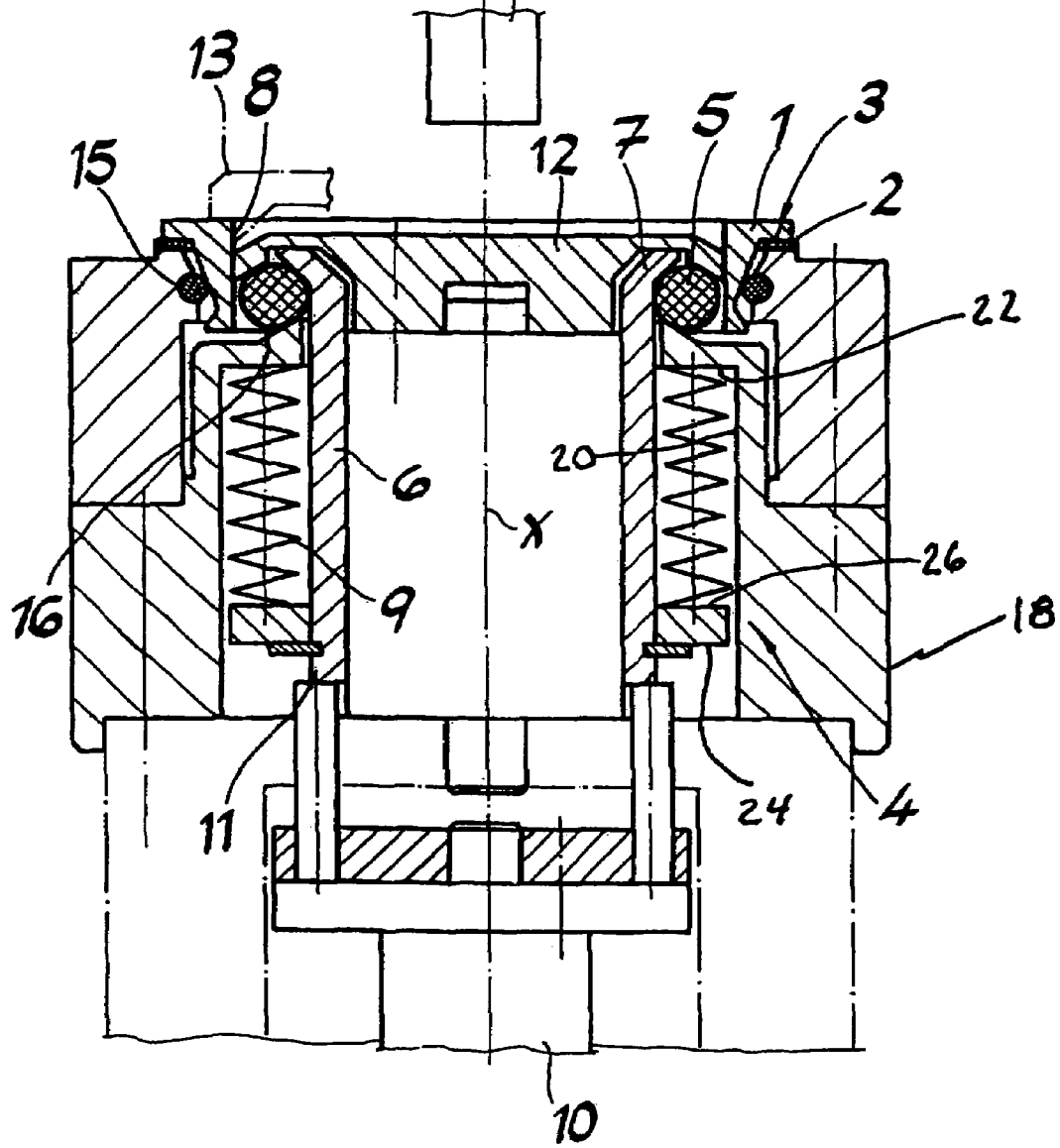
FIG. 1, a device according to the invention for clamping a workpiece in the untensioned state.
Figure 2:
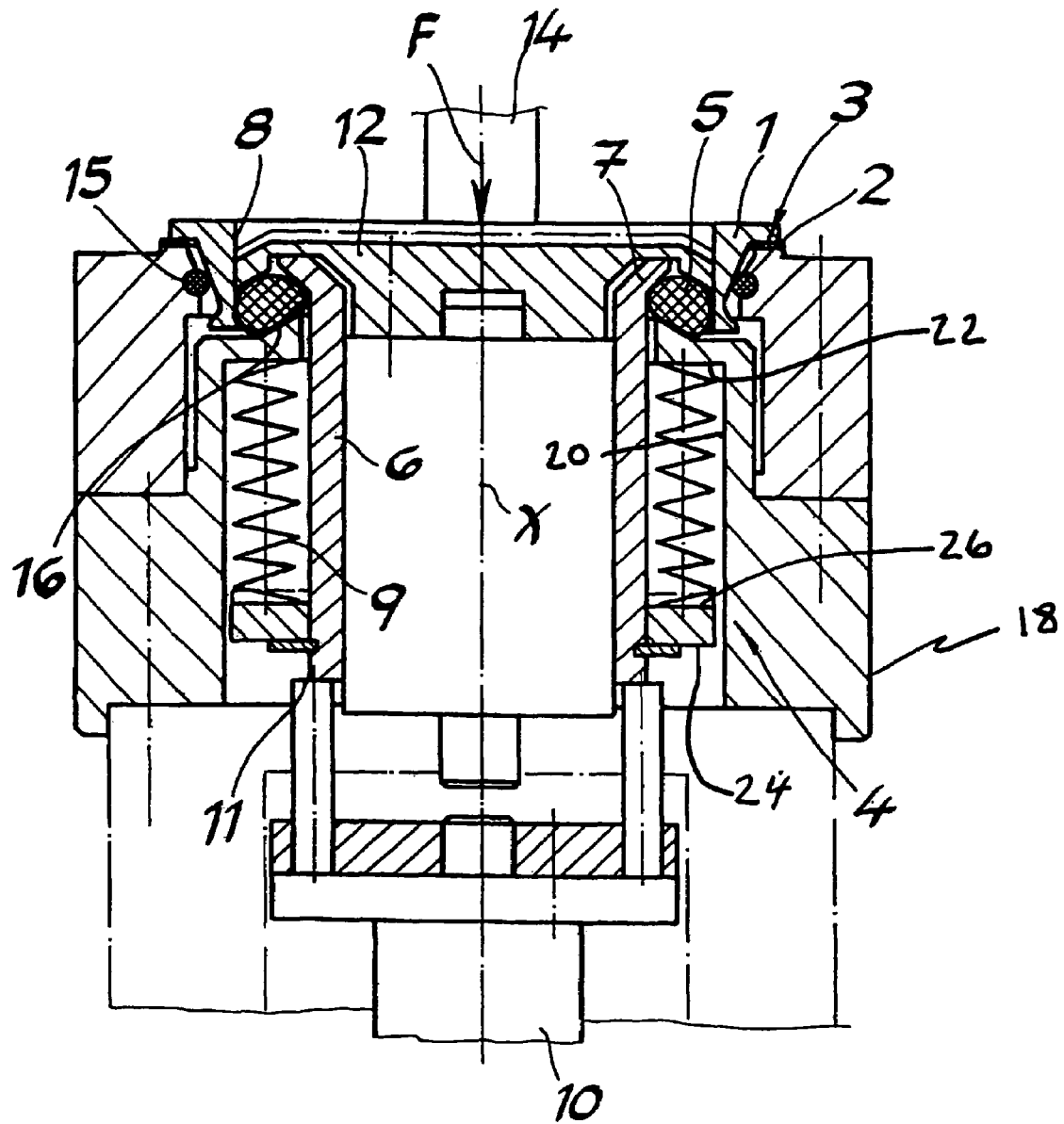
FIG. 2, the device illustrated in FIG. 1, with a firmly clamped workpiece.

FIGS. 1 and 2 show a device for clamping a ring-shaped workpiece 1. The device includes a contact member 2 of elastomeric material with a contact support surface 3, onto which workpiece 1 can be set down. In FIGS. 1 and 2, contact support surface 3 is oriented perpendicular to the axis x of the workpiece. The device additionally includes a clamping device or workholder 4 with a clamping or biasing member 5 of an elastomeric material. For the fixation of workpiece 1, clamping member 5 can be advanced towards it. Clamping member 5 consists of an O-ring, which, as is evident from a comparative view of FIGS. 1 and 2, undergoes an advancement motion towards the workpiece 1 during the clamping process and simultaneously a motion parallel to the axis x of the workpiece. On its inward side, O-ring 5 abuts against a locally cone-shaped portion of the sleeve member 6 so that, by an axial motion of sleeve member 6, cone surface 7 presses O-ring 5 opposite the opening of the cone against inner annular surface 8 of workpiece 1. The application of the contact pressure of sleeve member 6 is accomplished by initially tensioned springs 9 located between a radial flange 22 of a sleeve portion 20 of a base support member 18 and the shoulder 26 of a radial flange 24 of the sleeve member 6. Cone-shaped portion of the sleeve member 6 can be moved upwards by a piston activated release device 10 with annular contact surface 11 in order to release workpiece 1. Also contacting the inner annular surface 8 of the workpiece 1 is an interchangeable part 12 which covers clamping device 4 and pre-adjusts the workpiece 1 when it is set onto contact support surface 3. Grippers 13 for loading and unloading a workpiece 1 are also provided.

During the clamping process, workpiece 1 is first set down onto contact support surface 3 and subsequently pressed against contact support surface 3 by clamping member 5 and simultaneously fixed in place perpendicular to the axis x of the workpiece 1. Thereafter, workpiece 1 is machined with a tool 14, for example, a grinding, honing or milling tool. For the fixation of workpiece 1, O-ring 5 undergoes a radial advancement motion towards workpiece 1 and simultaneously a motion parallel to the axis x of the workpiece 1 during the clamping process. O-ring 5 is first displaced simultaneously outwards and downwards by means of the cone-shaped portion of the sleeve member 6 during this process, until it comes to rest on the inner annular surface 8 of workpiece 1. Thereafter, the tensioning forces are increased by cross-sectional deformation of O-ring 5, and workpiece 1 is well-directedly pressed toward contact support surface 3. On its underside, O-ring 5 rests in this case against an annular tapered stop surface 16 that is inclined downwards to the outside. The level of clamping force can be determined by the type and number of springs 9. During machining of the workpiece 1, the axial machining forces of tool 14 are adjusted such that the resultant F of these forces lies in the vicinity of workpiece 1 axis x. The magnitude of the axial force exerted by O-ring 5 essentially corresponds to the overall axial force acting on workpiece 1 from the machining. After the machining of workpiece 1 is finished, the tension is released by moving sleeve member 6 upwards with the piston activated release device 10 and O-ring 5 moves away from workpiece 1 due to internal stress, so that the latter is released for removal.

It can also be seen from FIGS. 1 and 2 that workpiece 1 is located against a support ring 15 of elastomeric material, which may also be constructed as an O-ring, in addition to being braced against contact support surface 3. In the device according to the invention, in contrast to known equipment, both contact member 2 and clamping member 5 consists of elastomeric material, contact member 2 being constructed in this embodiment as a disk-shaped ring.

Figure 3:
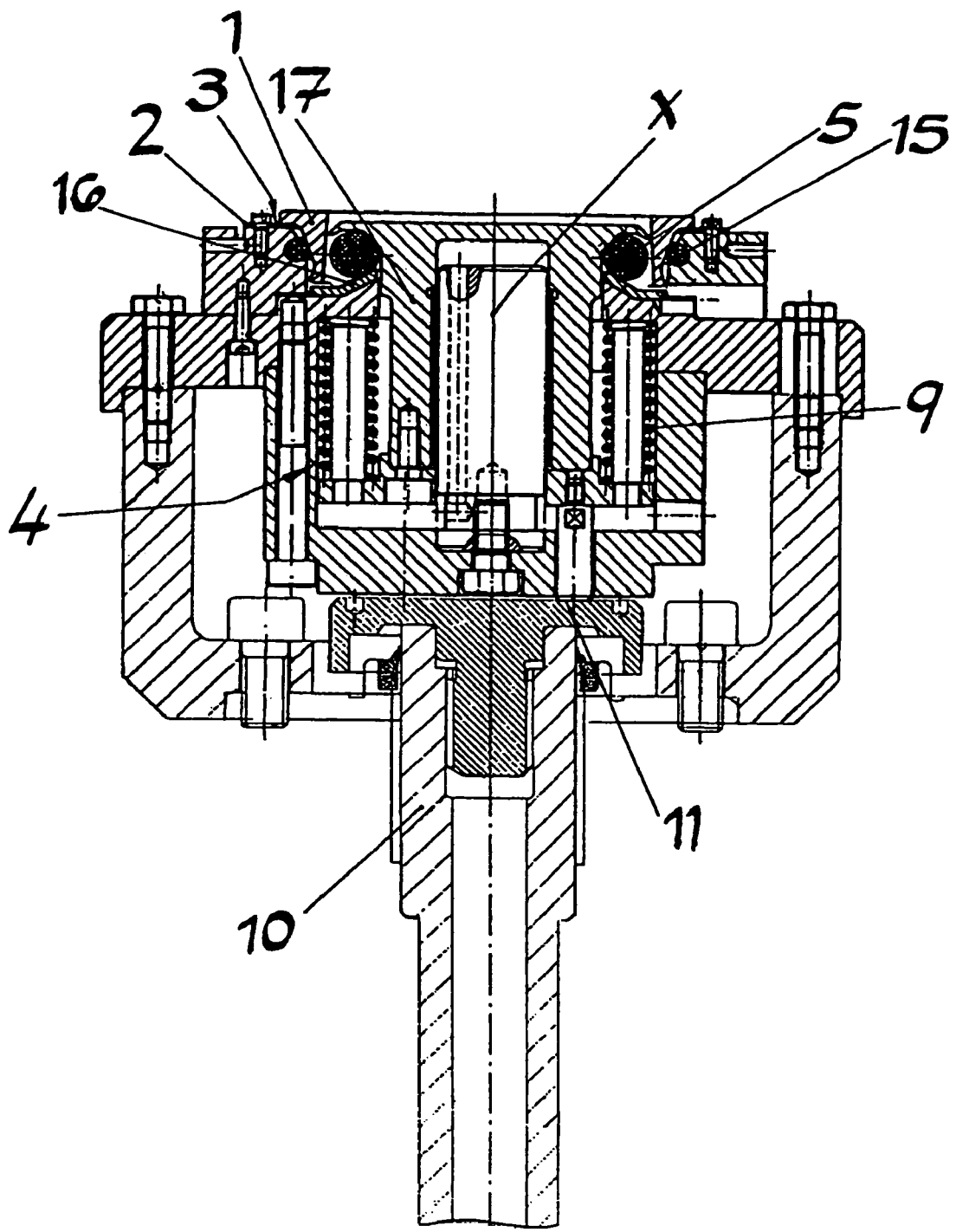
FIG. 3, another embodiment of the invention.

Interchangeable part 12 and sleeve member 6 can also be permanently joined together. In the embodiment of FIG. 3, an insert 17 is provided to fulfill the function of the interchangeable part 12 and the sleeve member 6. The device is shown in the untensioned state, in which the workpiece 1 can be inserted or removed. The clamping process is brought about by the lowering of piston activated release device 10.

The invention claimed is:

1. A clamping device for accurately clamping an annular workpiece having an inner surface, said clamping device comprising:
   a workholder having an end face; an opposite end face; and an aperture formed from said end face through said opposite end face, said aperture having a central axis;
   a base support member mounted to said workholder for supporting said workholder, said base support member having a sleeve portion extending into said aperture of said workholder in a direction towards said end face of said workholder, said sleeve portion terminating in a radial flange projecting radially inward towards said central axis and defining an aperture in said base support member, said aperture having a stepped base;
   an O-ring member disposed on said radial flange of said sleeve portion of said base support member; and
   means for imposing a clamping force on said O-ring member, said means for imposing a clamping force on said O-ring member mounted complementary with said O-ring member and said inner surface of said workpiece whereby when said workpiece is mounted to said workholder and extending into said aperture of said workholder, said clamping force resiliently deforms said O-ring member to generate a clamping force component on said workpiece in a direction away from said end face of said workholder and a clamping force component in a direction towards said inner surface of said workpiece to securely hold said workpiece in said workholder for machining thereof.

2. The clamping device as claimed in claim 1 further comprising means for mounting said workpiece to said workholder, said mounting means comprising elastomeric support means having a first support member mounted to said end face of said workholder and a second support member mounted in said aperture in said workholder whereby when said workpiece is mounted to said workholder said elastomeric support means support said workpiece.

3. The clamping device as claimed in claim 1 further comprising means for releasing said clamping force imposed on said O-ring member.

4. The clamping device as claimed in claim 1 wherein said means for imposing a clamping force on said O-ring member further comprising:
   a conical surface disposed on said radial flange of said sleeve portion of said base support member; said conical surface supporting said O-ring member;
   a cylindrical sleeve member having one end terminating with a conical surface on the outside diameter thereof, said cylindrical sleeve member mounted within said aperture of said base support member and said aperture of said workholder, said conical surface juxtaposed said O-ring member; said cylindrical sleeve member further having an opposite end terminating in a radial flange defining a shoulder on the outside diameter of said cylindrical sleeve member; and
   means for biasing disposed between said shoulder of said cylindrical sleeve member and said radial flange of said sleeve portion of said base support member; whereby said means for biasing biases said cylindrical sleeve member to move along an axial direction to impose said clamping force on said O-ring member.

5. The clamping device as claimed in claim 4 further comprising means for releasing said clamping force imposed on said O-ring member.

6. The clamping device as claimed in claim 5 wherein said means for releasing further comprises:
   a piston member;
   an annular ring member mounted to said piston member, said annular ring member having an annular contact surface contiguous said opposite end of said cylindrical sleeve member; and
   means for moving said piston member along said axial direction such that as said moving means is actuated to move said piston member in said axial direction said cylindrical sleeve member is moved axially to overcome said biasing means and thereby release said clamping force imposed on said O-ring member.

7. The clamping device as claimed in claim 4 further comprising an interchangeable cover member mounted to said one end of said cylindrical sleeve member, said interchangeable cover member further located within said inner surface of said workpiece.

* * * * *